(12) United States Patent
Gurdan et al.

(10) Patent No.: US 11,169,545 B2
(45) Date of Patent: Nov. 9, 2021

(54) AERIAL DISPLAY VISUALIZATION

(71) Applicant: Intel Corporation, Santa Clara, CA (US)

(72) Inventors: Tobias Gurdan, Germering (DE); Daniel Gurdan, Germering (DE)

(73) Assignee: Intel Corporation, Santa Clara, CA (US)

( * ) Notice: Subject to any disclaimer, the term of this patent is extended or adjusted under 35 U.S.C. 154(b) by 173 days.

(21) Appl. No.: 16/459,367

(22) Filed: Jul. 1, 2019

(65) Prior Publication Data

US 2020/0033891 A1 Jan. 30, 2020

Related U.S. Application Data

(63) Continuation of application No. 15/721,164, filed on Sep. 29, 2017, now Pat. No. 10,338,610.
(Continued)

(51) Int. Cl.

| | |
|---|---|
| *G05D 1/10* | (2006.01) |
| *B64C 39/02* | (2006.01) |
| *G09F 21/06* | (2006.01) |
| *B64D 47/06* | (2006.01) |
| *G08G 5/00* | (2006.01) |

(52) U.S. Cl.
CPC ........... *G05D 1/104* (2013.01); *B64C 39/024* (2013.01); *B64D 47/06* (2013.01); *G09F 21/06* (2013.01); *B64C 2201/12* (2013.01); *G08G 5/0052* (2013.01); *G08G 5/0069* (2013.01)

(58) Field of Classification Search
CPC .. G05D 1/104; B64C 39/024; B64C 2201/12; B64D 47/06; G09F 21/06; G08G 5/0052–0069
See application file for complete search history.

(56) References Cited

U.S. PATENT DOCUMENTS

| | | |
|---|---|---|
| 5,521,817 A | 5/1996 | Burdoin et al. |
| 10,338,610 B2 | 7/2019 | Gurdan |

(Continued)

OTHER PUBLICATIONS

Unknown, "What Is The Difference Between An Absolute and A Relative Location?" retrieved from https://www.worldatlas.com/articles/what-is-the-difference-between-an-absolute-and-a-relative-location.html (Year: 2021).*
(Continued)

*Primary Examiner* — Calvin Cheung
(74) *Attorney, Agent, or Firm* — Schwegman Lundberg & Woessner, P.A.

(57) ABSTRACT

Disclosed herein are systems and methods for distributing a plurality of drones to form an aerial image. The systems and methods may include: receiving, at a computing device comprising a processor, location data and drone data; distributing, by the computing device, a plurality of drones based on the aspects of an aerial image such that, during flight, the plurality of drones form the aerial image; and exporting, by the computing device, coordinates for each of the plurality of drones. The location data may define aspects of the aerial image to be formed by the plurality of drones. The drone data may include a number of drones within the plurality of drones. The coordinate for each of the plurality of drones may define a location for a respective drone within the aerial image.

20 Claims, 6 Drawing Sheets

Related U.S. Application Data

(60) Provisional application No. 62/421,371, filed on Nov. 13, 2016.

(56) References Cited

U.S. PATENT DOCUMENTS

| | | | |
|---|---|---|---|
| 2005/0021875 A1* | 1/2005 | Bouthemy | H04W 12/03 |
| | | | 709/250 |
| 2014/0236388 A1* | 8/2014 | Wong | F21V 21/15 |
| | | | 701/2 |
| 2018/0074172 A1 | 3/2018 | Gianvittorio | |
| 2018/0074520 A1* | 3/2018 | Liu | G08G 5/0052 |
| 2018/0136670 A1 | 5/2018 | Gurdan | |
| 2020/0033888 A1* | 1/2020 | Han | G01S 5/0278 |

OTHER PUBLICATIONS

"U.S. Appl. No. 15/721,164, Notice of Allowance dated Feb. 13, 2019", 10 pgs.

* cited by examiner

Fig. 8

AERIAL DISPLAY VISUALIZATION

CROSS-REFERENCE TO RELATED APPLICATIONS

This application is a continuation of U.S. patent application Ser. No. 15/721,164, filed Sep. 29, 2017, now issued as U.S. Pat. No. 10,338,610, which is related to and claims priority to U.S. Provisional Application No. 62/421,371 filed on Nov. 13, 2016, the content of which its hereby incorporated in its entirety.

TECHNICAL FIELD

Embodiments described generally herein relate to drones. Some embodiments relate to visualization of aerial images using a plurality of drones.

BACKGROUND

An unmanned aerial vehicle (UAV), commonly known as a drone, is an aircraft without a human pilot aboard. The size of drones may range from small hobby scale suitable for close range operation proximate to a user to large scale systems capable of hauling large payloads over many miles. Drones may be used to provide services, perform military operations, or as a hobby.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Drone usage is becoming more and more common as prices for drones decrease and the capabilities of drones increase. For example, as disclosed herein, drones may be programed to launch, flying a predefined flightpath, illuminate one or more onboard light emitting diodes (LED), and recover to a predetermined location. All of these activities may be accomplished without user intervention. With the increased drone capabilities and decreased costs, drone usage may be implemented in a variety of entertainment, safety, or emergency scenarios.

As disclosed herein, an aerial display may be made up of various images or frames. The various frames or images may be comprised of a plurality of drones where individual or groups of drones in the fleet represent pixels of images or frames. For example, to form a letter, the plurality of drones may be distributed throughout a space such that when viewed by an audience, the audience views the plurality of drones as the letter. In addition to letters, various shapes and other forms may be created as part of the aerial performance. As disclosed herein, a plurality of drones may be termed a drone fleet, a group of drones, a platoon of drones, a battery of drones, a team of drones, or a swarm of drones.

Figure 1:
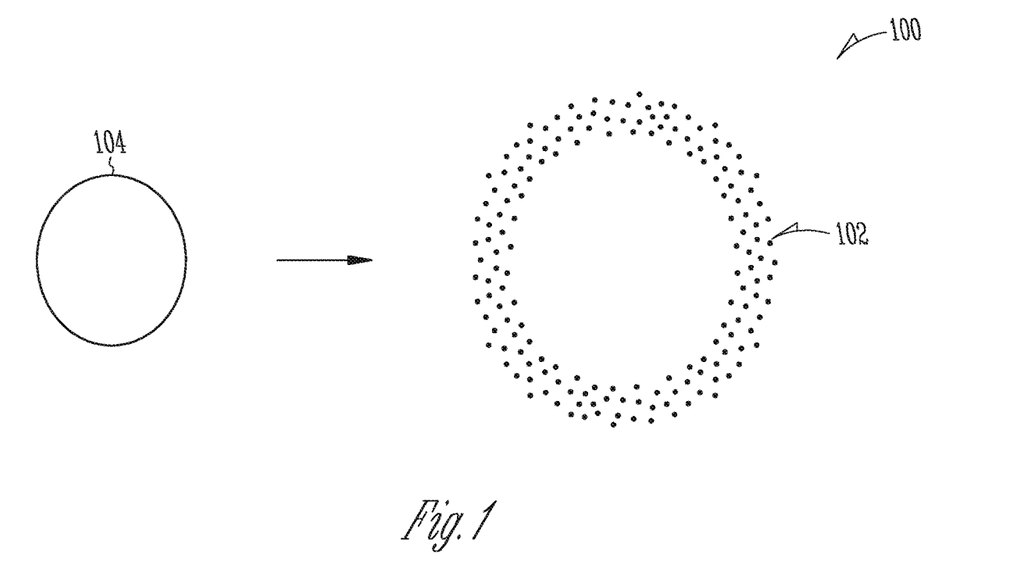
FIG. 1 illustrates an example schematic of an aerial display in accordance with some embodiments.

Turning now to the figures, FIG. 1 illustrates an example schematic of an aerial display 100 in accordance with some embodiments. As shown in FIG. 1, the aerial display 100 may include a plurality of drones 102 that form an outline. The outline may be a circular shape as shown in FIG. 1, or any other shape or combination of shapes. The aerial image 100 may be of an image 104. The image 104 may be a line drawing, picture, etc. of a shape or other feature that is to be formed by the plurality of drones 102.

Figure 2:
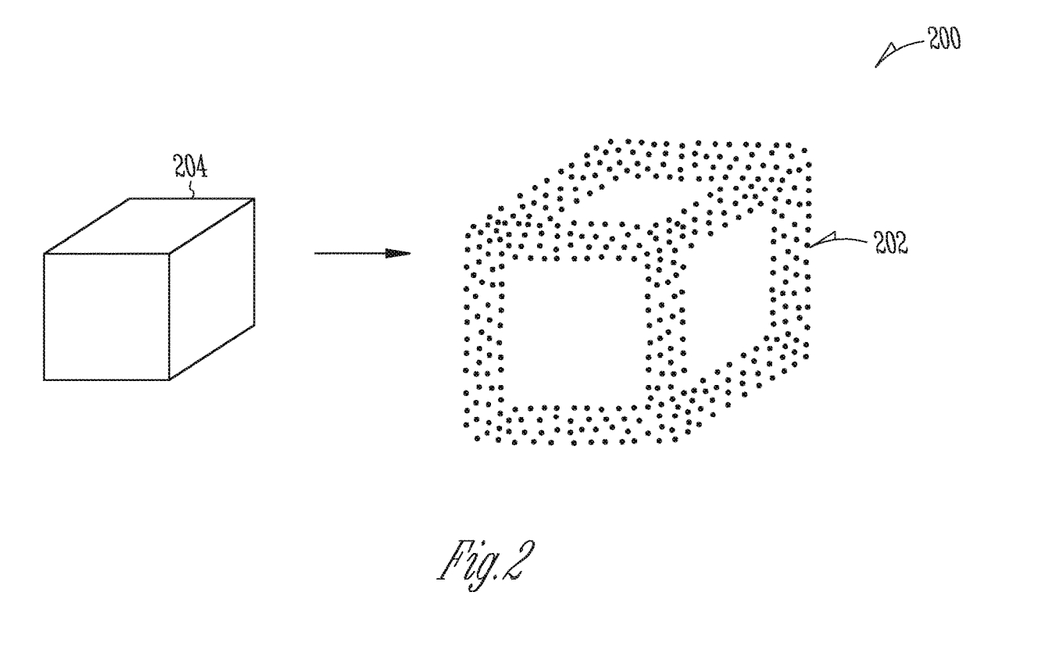
FIG. 2 illustrates an example schematic of an aerial display in accordance with some embodiments.

FIG. 2 illustrates an example schematic of an aerial display 200 in accordance with some embodiments. As shown in FIG. 2, a 3D image may be created using a plurality of drones 202. While FIG. 2 displays a hollow cubic type image, as disclosed herein, the 3D image may be solid. For example, the aerial display 200 may be a car or other structure that does not have visible voids. As a result, the plurality of drones 202 may be arranged to represent a surface of the object such that the object appears solid. The aerial image 200 may be of an image 204. The image 204 may be a line drawing, picture, etc. of a shape or other feature that is to be formed by the plurality of drones 202. As disclosed herein and as shown in FIGS. 1 and 2, the plurality of drones 102 and 202 may be form straight lines, 2D images, 3D images, curves, surfaces, etc.

Figure 3:
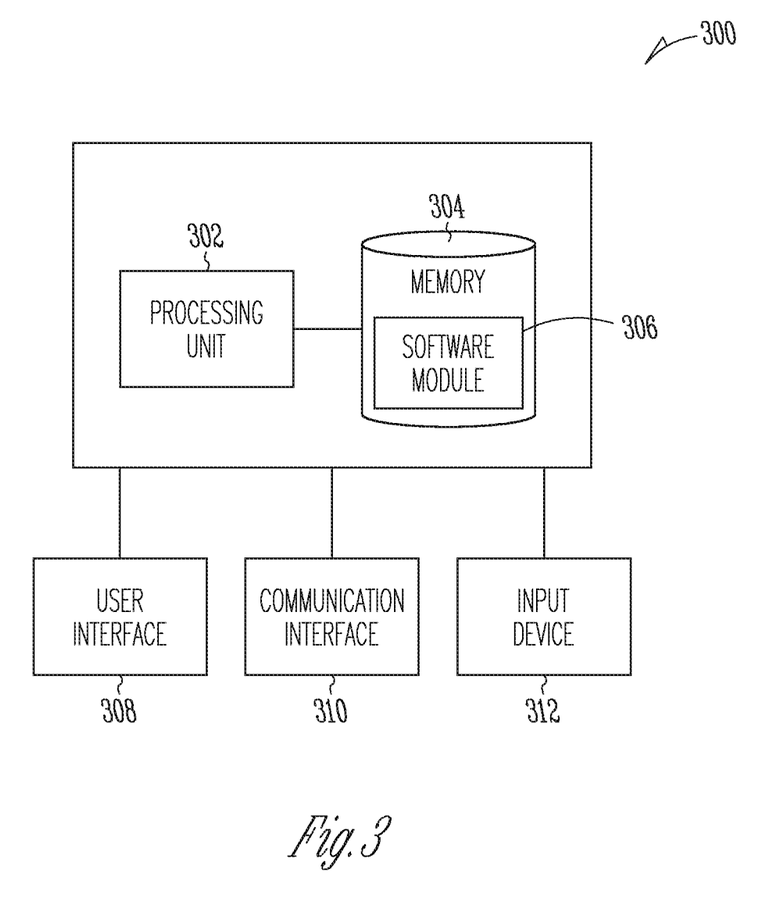
FIG. 3 illustrates an example computing device in accordance with some embodiments.

FIG. 3 shows an example schematic of a computing device 300 in accordance with some embodiments. The computing device 300 may be implemented as part of the computing network or as a standalone system. As shown in FIG. 3, the computing device 300 may include a processing unit 302 and a memory unit 304. The memory unit 304 may include a software module 306. While executing on the processing unit 302, the software module 306 may perform processes for commanding a drone, including, for example, one or more stages included in method 400 described below with respect to FIG. 4.

The computing device 300 may include a user interface 308. The user interface 308 may include any number of devices that allow a user to interface with the computing device 300. Non-limiting examples of the user interface 308 include a keypad, joystick, a display (touchscreen or otherwise), etc.

The computing device 300 may include a communications interface 310. The communications interface 310 may allow the computing device 300 to communicate with the plurality of drones or other computing devices. Non-limiting examples of the communications interface 310 include, automatic dependent surveillance-broadcast (ADS-B) In/Out modules, cellular modules, Ethernet cards (wireless or wired), Bluetooth® transmitters and receivers, near-field communications modules, etc.

The computing device 300 may include an input device 312. The input device 312 may allow the computing device 300 to receive inputs. Non-limiting examples of the input device 312 include a scanner, a digital camera (still or video), etc.

The computing device 300 may be implemented using a personal computer, a network computer, a mainframe, a handheld device, a personal digital assistant, a smartphone, or any other similar microcomputer-based workstation. As used herein, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multi-processor systems, microprocessor-based electronics, single-core or multi-core systems, combinations thereof, and the like. Thus, the term application may be used to refer to an embodiment of software or to hardware arranged to perform at least part of any operation described herein.

While a machine-readable medium may include a single medium, the term "machine-readable medium" may include a single medium or multiple media (e.g., a centralized or distributed database, and/or associated caches and servers). The term "machine-readable medium" may include any medium that is capable of storing, encoding, or carrying instructions for execution by a machine (e.g., the processing unit 302 or any other module) and that cause a machine to perform any one or more of the techniques of the present disclosure, or that is capable of storing, encoding or carrying data structures used by or associated with such instructions. In other words, the memory unit 304 may include instructions and may therefore be termed a machine-readable medium in the context of various embodiments. Other non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions may further be transmitted or received over a communications network using a transmission medium utilizing any one of a number of transfer protocols (e.g., frame relay, internet protocol (IP), TCP, user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

The term "transmission medium" shall be taken to include any intangible medium that is capable of storing, encoding or carrying instructions for execution by hardware processing circuitry, and includes digital or analog communications signals or other intangible medium to facilitate communication of such software.

Figure 4:
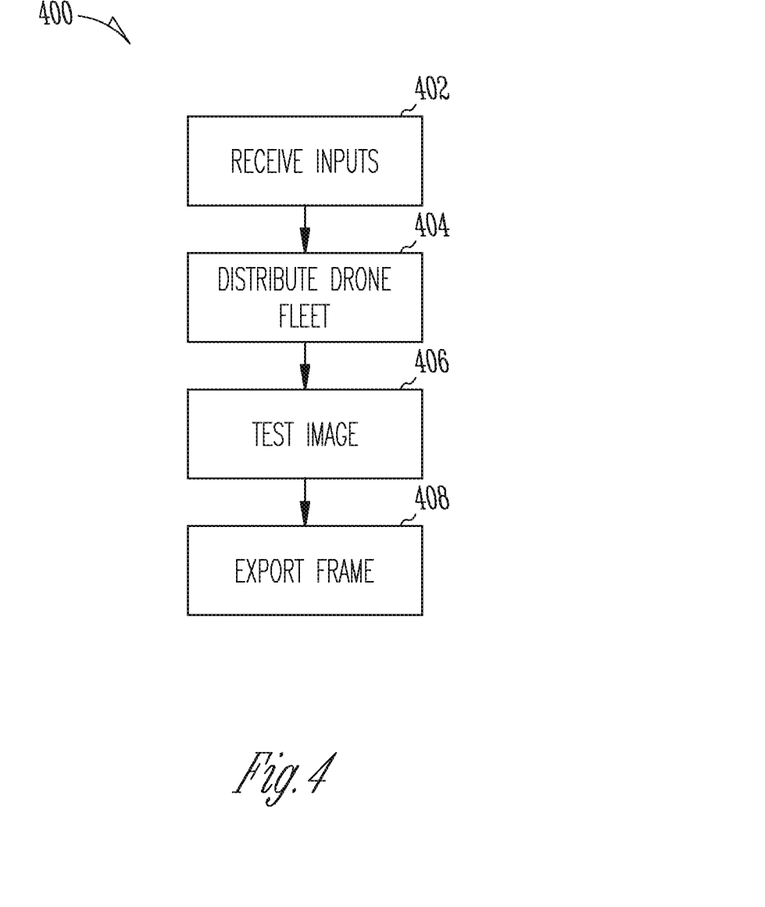
FIG. 4 illustrates an example method in accordance with some embodiments.

FIG. 4 illustrates an example method 400 in accordance with some embodiments. The method 400 may begin at stage 402 wherein inputs may be received. For example, an image (such as image 104 or image 204), a plurality of drones used to create the image, and a viewpoint may be received at a computing device (e.g., computing device 300 of FIG. 3). The image may define one or more boundaries, one or more vertices, or one or more points. In receiving the image, the computing device may also receive coordinates that define a space. For example, to define a square, the computing device may receive four ordered pairs. The ordered pairs may define a boundary for which the drones are to be distributed. Receiving the image may also include receiving an equation or other formula. For example, the computing device may receive an ordered pair that defines a center point of a circle and a radius as the image. The computing device may then distribute the drones about the center point at a distance approximate to the radius.

Figure 5A:
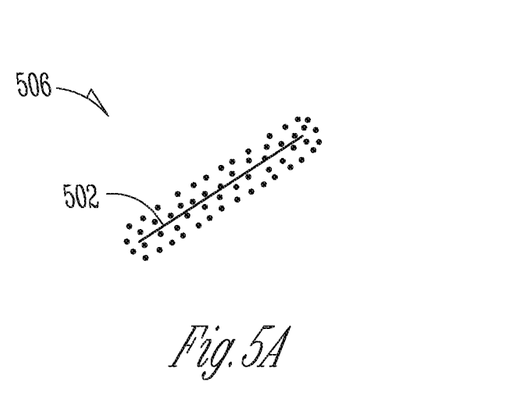
FIGS. 5A and 5B illustrate drone distribution in accordance with some embodiments.
Figure 5B:
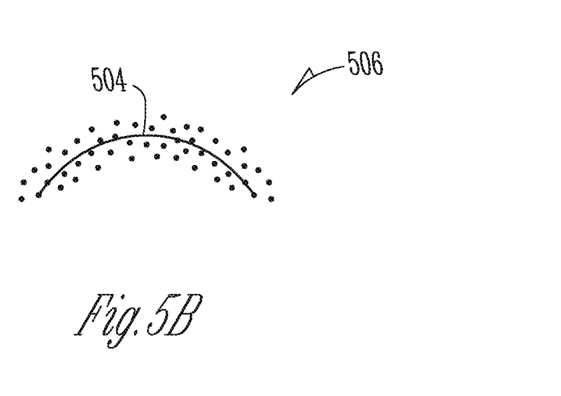

From stage 402, the method 400 may proceed to stage 404 where the plurality of drones may be distributed within the space defined by the image. The manner in which the drones are distributed may depend on the image to be formed. For example, to form a line or a curve, the drones may be distributed in a staggered fashion as shown in FIGS. 5A and 5B about the line. The plurality of drones (represented by dots 506) may be distributed (e.g., statistically) about a line 502 (FIG. 5A) or other form 504 (FIG. 5B). By distributing the drones about a shape as shown in FIGS. 5A and 5B, positioning errors associated with GPS receivers may be compensated for. For example, GPS accuracy may be +/−3 feet. As a result, trying to position the drones in a straight line may result in one or more of the drones being not lined up exactly with other drones. The mismatch in alignment may result in the image appearing blurry or otherwise formed incorrectly. By distributing the drones about the line, any mismatch in placement may be hidden or otherwise diminished.

Figure 6:
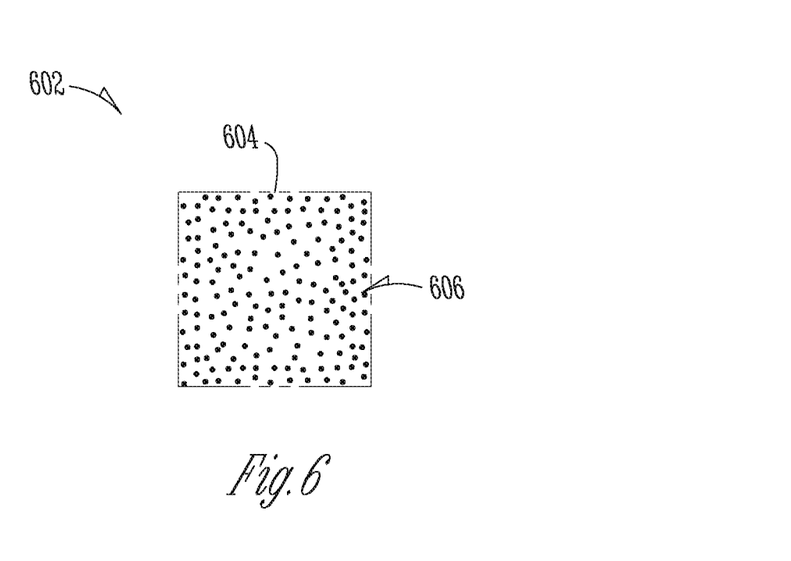
FIG. 6 illustrates drone distribution in accordance with some embodiments.

As shown in FIG. 6, for a surface feature 602 bounded by a region 604, the plurality of drones 606 (represented by dots) may be distributed using a random distribution or other appropriate distribution. For example, for a simple figure such as a rectangle, a Monte Carlo simulation may be used to distribute N drones within the region.

When distributing the plurality of drones 606, pair-wise forces may be used to keep plurality of drones 606 within a boundary. For example, after randomly distributing the plurality of drones 606, a drone 606 may be located too close to a boundary such that the drone 606 cannot be assured to remain inside the boundary due to GPS errors etc. As a result, the drone 606 may be redistributed such that the drone 606 is relocated to a position such that the drone 606 will be within the region given a tolerance of the drone 606 to position itself. For instance, the drone 606 may be repositioned such that the drone 606 is within +/−1 foot of a boundary.

The shape of an image may be controlled via the distribution of the plurality of drones as well as the color of the plurality of drones. For example, to form a cube in the sky, the drones forming the edges of the cube may be a different color than the drones forming the surfaces of the cube. Also, for curved surfaces, the plurality of drones may be distributed in closer proximity to one another at areas of greater curvature. In addition, color may also be used to help visualize curvature. For example, areas of greater curvature may utilize a first color (e.g. red) and areas of less curvature may utilize a second color (e.g., blue).

During the distribution process, the computing device may also detect different parts of the image. For example, in forming a lowercase "i," the image may include two parts, the lower straight part of the i and the dot. As a result, the computing device may detect, either automatically or via input from a user, the two different regions that may need drones. Once the two regions are identified, the computing device may compare the area of the two regions and distribute plurality of drones. For example, the dot in the i may have an area that is one-third the area of the vertical portion of the i and the i may be formed with 100 drones. As a result, the computing device may utilize 25 drones to form the dot and 75 drones to form the vertical portion. As indicated herein, the drones may be distributed using k-means clustering, normal distributions, uniform distributions, Weibull distributions, variational distribution optimization, etc.

Returning to FIG. 4, from stage 404, the method 400 may proceed to stage 406, where the image may be tested. For example, once computing device has distributed the plurality of drones, the result may be pixelated image, where each pixel represents a drone. This image may be compared to the input image to determine if the distribution of the plurality of drones adequately represents the input image. For example, a person may view a representation of the drones forming the aerial image on a display and determine if the representation adequately represents the input image. In addition, the computing device may perform an image analysis of an image prepared by the computing device showing the drone placement to determine if the distribution of the drones adequately represents the input image.

For example, when forming a line segment, a least square analysis may be performed on the drone locations. From the analysis, a correlation coefficient (sometimes called an R-value or $R^2$ value) may be determined. If the correlation coefficient is above or below a preset value, the distribution of the plurality of drones may be deemed unsatisfactory. For instance, if the correlation coefficient is too close to 1, the plurality of drones may be too closely spaced to the line about which they are distributed. Due to possible position errors associated with GPS receivers attached to the drones, having the drones too closely spaced may result in a collision or otherwise distort the image. If the correlation coefficient is below are preset values (e.g., 0.8 or 0.75), then the plurality of drones may not be spaced closely enough about the line which they are distributed. Thus, instead of appearing to form a line (or other surface), when the correlation coefficient is too low, the drones may appear as a random pattern instead of accurately forming the image.

As another example, when using variational distribution, an analysis may be performed to determine if drones are located in key position or if an adequate number of drones are located in key positions. For example, when forming a face, the tip of the nose may be considered a key position. As a result, when the drones are distributed, the variation in drones distributed proximate the tip of the nose may be compared to the distribution of drones distributed to form the cheek.

An image formed by the distribution of the plurality of drones may also be analyzed in a view dependent form. For example, the audience may only view the aerial display from one direction. As a result, the aerial image formed by the plurality of drones may be analyzed from that perspective. If the aerial display is view from multiple directions (e.g., in a football stadium), then the aerial image formed by the plurality of drones may be analyzed from various viewpoints to determine if the image is adequately represented from the various viewpoints.

The viewpoint analysis and distributing the plurality of drones within a frame may incorporate ray casting. For example, rays may be cast from a vantage point that represents one or move viewers. The intersection of the rays with the image may be used to determine what the image may look like to the viewer. For instance, based on the intersection of the rays, the areas that may be hidden from a user may be determined. For areas that are hidden from a user, any drones that may be distributed in that area may be removed and redistributed elsewhere by the computing device. Using ray casting may allow the use of discrete render buffers to be avoided.

In addition, a finite element approach may be used to analyze the distribution of the plurality of drones. For example, each drone may represent a node in a finite element model. The model may then be subjected to different conditions to determine a reaction. For instance, a heat source may be applied to a node. The node may be a location of a drone and the node selected to be a heat source may be selected at random by the computing device. In another example, the node selected as the heat source may be a prominent feature of the image, such as a corner of an object, a portion of a curve where a radius of curvature is smallest, etc. If the heat distributes slowly, then the placement of a drone at that node may be appropriate. If the heat distributes quickly, then a drone may not be needed at that location and vice versa.

From stage 406, the method 400 may proceed to stage 408 where a frame may be exported. For example, once the analysis has been performed and the distribution of the plurality of drones is satisfactory to produce the desired images as indicated by the image analysis, finite element approaches, or other techniques disclosed herein, the coordinates of the plurality of drones may be exported as a text file or some other file format that may be readable by the plurality of drones or other programs as needed.

The coordinates may be absolute coordinates, relative coordinates, or a combination or absolute and relative coordinates. For example, a combination of absolute and relative coordinates may be where one drone is designated a master drone and the coordinates of all the other drones are relative to the master drone. The master drone may have an absolute coordinate defining a latitude, longitude, and altitude. The other drones may have relative coordinates that define a distance from the master drone using a predefined coordinate system such as a Cartesian coordinate system, a polar coordinate system, or a spherical coordinate system. Thus, the location of the aerial display may be independent of venue and only dependent on the absolute location of the master drone. The master drone may be different in each frame. For instance, a first drone may be the master drone in a first frame and a second drone may be the master drone in a second frame. The location of the master drone may be defined as a latitude and longitude of the Earth and an altitude with reference to mean sea level (MSL). In addition, the coordinate system used may be different for different drones in the same frame. For example, a first subset of drones may form a curved surface within a frame and may utilize a spherical coordinate system and a second subset of drones may form a flat surface within the frame and may utilize a Cartesian coordinate system.

For relative coordinates, a reference point may be defined and the coordinates of the plurality of drones may be relative to the coordinates of the reference point. For example, the reference point may be defined as a corner of a field or a beacon that may be located at the site of the aerial performance. For example, the coordinates may be a vector from the beacon. Each of the drones may use the vector and the location of the beacon to define a GPS coordinate for the location of the drone during the aerial show.

Figure 7:
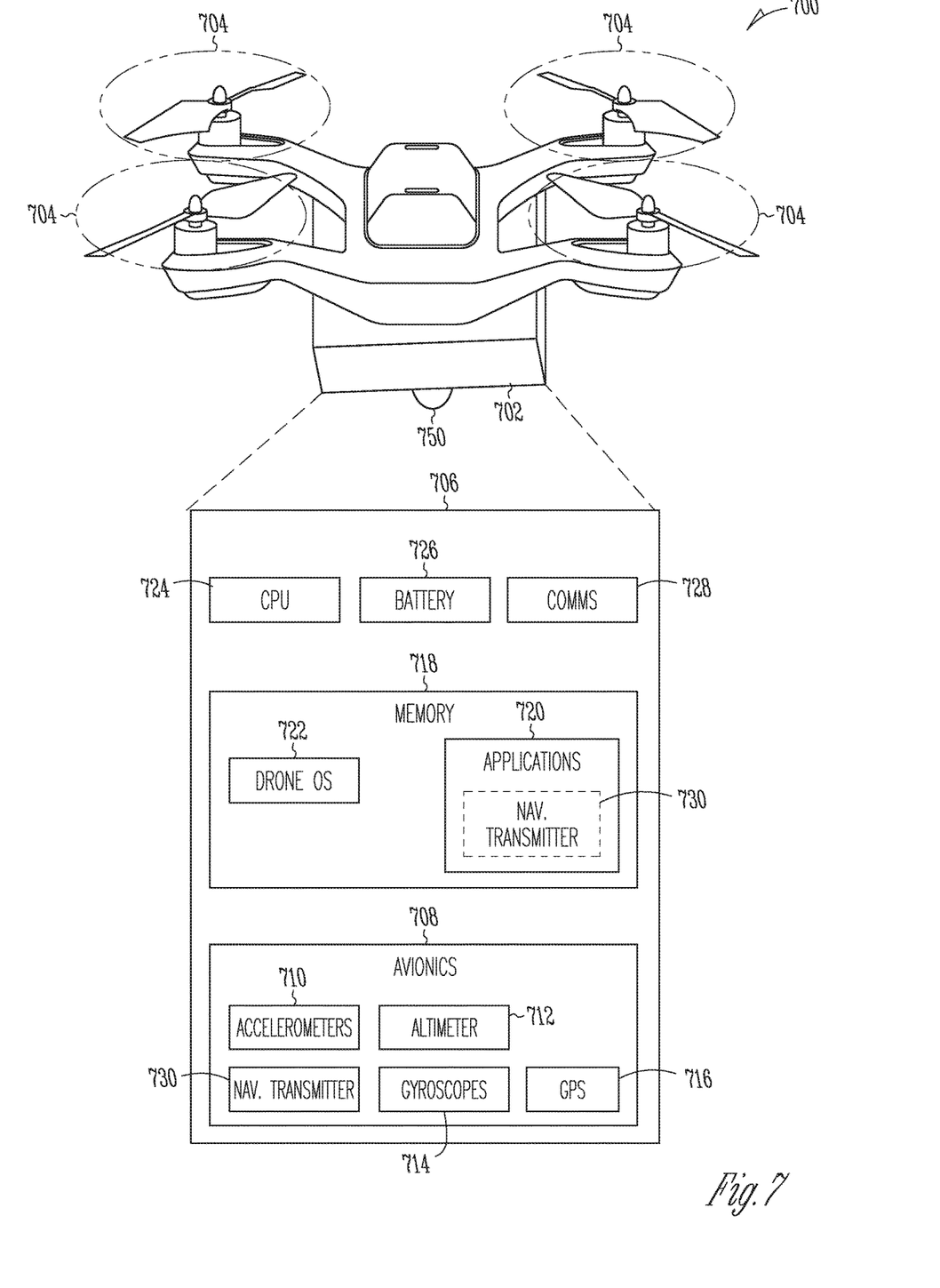
FIG. 7 illustrates an example schematic of a drone in accordance with some embodiments.

FIG. 7 shows an example schematic of a drone 700 in accordance with some embodiments, such as one of plurality of drones 102 or 202. As shown in FIG. 7, the drone 700 may include an airframe 702, a flight mechanism 704, and computing environment 706. The airframe 702 may be made of made of polymers, metals, etc. and the other components of the drone 700 may be secured to the airframe 702.

The flight mechanism 704 may include mechanisms that may propel the drone 700 through the air. For example, the flight mechanism 704 may include propellers, rotors, turbofans, turboprops, etc. The flight mechanism 704 may operably interface with avionics 708. The avionics 708 may be part of the computing environment 706 (as shown in FIG. 7) or standalone components. For example, the avionics 708 may include accelerometers 710, an altimeter 712, gyroscopes 714, and a GPS receiver 716.

The various components of the avionics 708 may be standalone components or may be part of an autopilot system or other avionics package. For example, the altimeter 712 and GPS receiver 716 may be part of an autopilot system that includes one or more axes of control. For instance, the autopilot system may be a two-axis autopilot that may maintain a preset course and hold a preset altitude. The avionics 708 may be used to control in-flight orientation of the drone 700. For example, the avionics 708 may be used to control orientation of the drone 700 about pitch, bank, and yaw axes while in flight.

The avionics 708 may allow for autonomous flight. For example, as described herein, the drone 700 may receive a flightpath that the drone 700 may fly without further user input. In addition, the avionics 708 may include a navigation transmitter 730 that may be used to transmit commands to the flight mechanism 704. While FIG. 7 shows the navigation transmitter 730 as part of the avionics 708, the navigation transmitter 730 may be software stored in a memory 718 as shown by dashed navigation transmitter 730.

The computing environment 706 may also include the memory 718 that may store applications 720 and a drone operating system (OS) 722. The applications 720 may include lighting controls for controlling one or more LEDs 750. The applications 720 may include a communications program that may allow drone 700 to communicate with the computing device 300. In addition, the applications 720 may include software that functions as the navigation transmitter 730.

The memory 718 may provide a secure area for storage of components used to authenticate communications between the drone 700 and the computing device 300. For example, the memory 718 may store SSL certificates or other security tokens. The data stored in the memory 718 may be read-only data such that during operation the data cannot be corrupted or otherwise altered by malware, viruses, or by other users that may try and take control of the drone 700.

The computing environment 706 may include a central processing unit (CPU) 724, a battery 726, and a communications interface 728. The CPU 724 may be used to execute operations and method steps, such as those described herein with regard to FIGS. 5 and 7. The memory 718 also may store data received by the drone 700 as well as programs and other software utilized by the drone 700. For example, the memory 718 may store instructions that, when executed by the CPU 724, cause the CPU 724 to perform operations such as those described herein.

The communications interface 728 may include transmitters, receivers, or transceivers that may be used to communicate with the computing device 300. For example, the communications interface 728 may include an automatic dependent surveillance-broadcast (ADS-B) receiver (ADS-B In) or transmitter (ADS-B Out) that may send and receive data. In addition, the communications interface 728 may include a cellular interface or other wireless credential exchange modules. For example, the communications interface 728 may include an ADS-B In and Out module that allows the drone 700 to transmits its position to the computing device 300 and also allow the drone 700 to receive the flightpaths and other data from the computing device 300.

While FIG. 7 shows various components of the drone 700, not all components shown in FIG. 7 are required. For example, drone 700 may not have the gyroscopes 714, the altimeter 714, etc.

Figure 8:
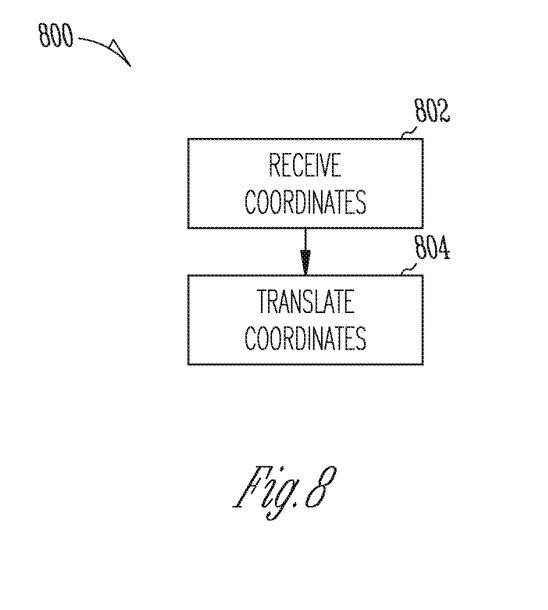
FIG. 8 illustrates an example method in accordance with some embodiments.

FIG. 8 illustrates an example method 800 in accordance with some embodiments. The method 800 may begin at stage 802 where a drone (e.g., drone 700 of FIG. 7) may receive coordinates. For example, a computing device may transmit a file or other data including the coordinates to the drone. From stage 802, the method 800 may proceed to stage 804 where the drone may translate the coordinates. For example, the coordinates received by the drone may be a vector from a beacon. The drone may not be located at the beacon. Thus, the drone may translate the determine a flight path to the coordinate. For instance, the coordinates received may be in form of (X, Y, Z), where X may be X feet in the positive x-axis, Y may be Y feet in the positive y-axis, and Z may be Z feet in the positive z-axis, where the coordinate system is aligned to an agreed upon system. For instance, the x-axis may be the east-west attitude line, the y-axis may be the north-south longitude line, and the z-axis may be the orthogonal axis extending from the x-y plane. The origin of the coordinate system may be a beacon placed proximate the launch pad or the computing device. The drone may know the location of the beacon as well as its location. For instance, a vector from the beacon to the drone may be (1,0,0). Stated another way, the drone is 1 unit of measurement in the x-direction, and 0 unites of measurement in the y and z directions from the beacon. Thus, to translate the coordinates, the drone may add one unit of measurement to each of the X components of the coordinates.

EXAMPLES

Example 1 is a method for distributing a plurality of drones to form an aerial image, the method comprising: receiving, at a computing device comprising a processor, location data and drone data, the location data defining aspects of an aerial image to be formed by a plurality of drones, the drone data include a number of drones within the plurality of drones; distributing, by the computing device, the plurality of drones based on the aspects of the aerial image such that, during flight, the plurality of drones form the aerial image; and exporting, by the computing device, coordinates for each of the plurality of drones, the coordinate for each of the plurality of drones defining a location for a respective drone within the aerial image.

In Example 2, the subject matter of Example 1 optionally includes wherein the aspects of the aerial image include a line segment.

In Example 3, the subject matter of Example 2 optionally includes wherein distributing the plurality of drones includes distributing the plurality of drones proximate the line segment.

In Example 4, the subject matter of any one or more of Examples 1-3 optionally include wherein the aspects of the aerial image include a surface.

In Example 5, the subject matter of Example 4 optionally includes wherein distributing the plurality of drones includes distributing the plurality of drones within edges defining the surface.

In Example 6, the subject matter of any one or more of Examples 4-5 optionally include wherein distributing the plurality of drones includes distributing the plurality of drones proximate edges defining the surface.

In Example 7, the subject matter of any one or more of Examples 1-6 optionally include wherein the aspects of the aerial image include a volume.

In Example 8, the subject matter of Example 7 optionally includes wherein distributing the plurality of drones includes distributing a majority of the plurality of drones proximate corners or edges of the volume.

In Example 9, the subject matter of any one or more of Examples 1-8 optionally include wherein the aspects of the aerial image include shading.

In Example 10, the subject matter of any one or more of Examples 1-9 optionally include wherein distributing the plurality of drones includes distributing a subset of the plurality of drones.

In Example 11, the subject matter of any one or more of Examples 1-10 optionally include wherein distributing the plurality of drones includes: distributing a first subset of the plurality of drones, the first subset of the plurality of drones having a first color; and distributing a second subset of the plurality of drones, the second subset of drones having a second color.

Example 12 is at least one computer-readable medium comprising instructions to perform any of the methods of Examples 1-11.

Example 13 is an apparatus comprising means for performing any of the methods of Examples 1-11.

Example 14 is a system for distributing a plurality of drones to form an aerial image, the system comprising: a processor; and a memory storing instructions that, when executed by the processor, cause the processor to: receive location data and drone data, the location data defining aspects of an aerial image to be formed by a plurality of drones, the drone data include a number of drones within the plurality of drones; distribute the plurality of drones based on the aspects of the aerial image such that, during flight, the plurality of drones form the aerial image; and export coordinates for each of the plurality of drones, the coordinate for each of the plurality of drones defining a location for a respective drone within the aerial image.

In Example 15, the subject matter of Example 14 optionally includes wherein the aspects of the aerial image include a line segment.

In Example 16, the subject matter of Example 15 optionally includes wherein distributing the plurality of drones includes instructions that, when executed by the processor, cause the processor to distribute the plurality of drones proximate the line segment.

In Example 17, the subject matter of any one or more of Examples 14-16 optionally include wherein the aspects of the aerial image include a surface.

In Example 18, the subject matter of Example 17 optionally includes wherein distributing the plurality of drones includes instructions that, when executed by the processor, cause the processor to distribute the plurality of drones within edges defining the surface.

In Example 19, the subject matter of any one or more of Examples 17-18 optionally include wherein distributing the plurality of drones includes instructions that, when executed by the processor, cause the processor to distribute the plurality of drones proximate edges defining the surface.

In Example 20, the subject matter of any one or more of Examples 14-19 optionally include wherein the aspects of the aerial image include a volume.

In Example 21, the subject matter of Example 20 optionally includes wherein distributing the plurality of drones includes instructions that, when executed by the processor, cause the processor to distribute a majority of the plurality of drones proximate corners or edges of the volume.

In Example 22, the subject matter of any one or more of Examples 14-21 optionally include wherein the aspects of the aerial image include shading.

In Example 23, the subject matter of any one or more of Examples 14-22 optionally include wherein distributing the plurality of drones includes instructions that, when executed by the processor, cause the processor to distribute a subset of the plurality of drones.

In Example 24, the subject matter of any one or more of Examples 14-23 optionally include wherein distributing the plurality of drones includes instructions that, when executed by the processor, cause the processor to: distribute a first subset of the plurality of drones, the first subset of the plurality of drones having a first color; and distribute a second subset of the plurality of drones, the second subset of drones having a second color.

Example 25 is a system for distributing a plurality of drones to form an aerial image, the method comprising: means for receiving location data and drone data, the location data defining aspects of an aerial image to be formed by a plurality of drones, the drone data include a number of drones within the plurality of drones; means for distributing the plurality of drones based on the aspects of the aerial image such that, during flight, the plurality of drones form the aerial image; and means for exporting coordinates for each of the plurality of drones, the coordinate for each of the plurality of drones defining a location for a respective drone within the aerial image.

In Example 26, the subject matter of Example 25 optionally includes wherein the aspects of the aerial image include a line segment.

In Example 27, the subject matter of Example 26 optionally includes wherein the means for distributing the plurality of drones includes means for distributing the plurality of drones proximate the line segment.

In Example 28, the subject matter of any one or more of Examples 25-27 optionally include wherein the aspects of the aerial image include a surface.

In Example 29, the subject matter of Example 28 optionally includes wherein the means for distributing the plurality of drones includes means for distributing the plurality of drones within edges defining the surface.

In Example 30, the subject matter of any one or more of Examples 28-29 optionally include wherein the means for distributing the plurality of drones includes means for distributing the plurality of drones proximate edges defining the surface.

In Example 31, the subject matter of any one or more of Examples 25-30 optionally include wherein the aspects of the aerial image include a volume.

In Example 32, the subject matter of Example 31 optionally includes wherein the means for distributing the plurality of drones includes means for distributing a majority of the plurality of drones proximate corners or edges of the volume.

In Example 33, the subject matter of any one or more of Examples 25-32 optionally include wherein the aspects of the aerial image include shading.

In Example 34, the subject matter of any one or more of Examples 25-33 optionally include wherein the means for distributing the plurality of drones includes means for distributing a subset of the plurality of drones.

In Example 35, the subject matter of any one or more of Examples 25-34 optionally include wherein the means for distributing the plurality of drones includes: means for distributing a first subset of the plurality of drones, the first subset of the plurality of drones having a first color; and means for distributing a second subset of the plurality of drones, the second subset of drones having a second color.

Example 36 is at least one computer-readable medium storing instructions that, when executed by a processor, cause the processor to: receive location data and drone data, the location data defining aspects of an aerial image to be formed by a plurality of drones, the drone data include a number of drones within the plurality of drones; distribute the plurality of drones based on the aspects of the aerial image such that, during flight, the plurality of drones form the aerial image; and export coordinates for each of the plurality of drones, the coordinate for each of the plurality of drones defining a location for a respective drone within the aerial image.

In Example 37, the subject matter of Example 36 optionally includes wherein the aspects of the aerial image include a line segment.

In Example 38, the subject matter of Example 37 optionally includes wherein distributing the plurality of drones includes instructions that, when executed by the processor, cause the processor to distribute the plurality of drones proximate the line segment.

In Example 39, the subject matter of any one or more of Examples 36-38 optionally include wherein the aspects of the aerial image include a surface.

In Example 40, the subject matter of Example 39 optionally includes wherein distributing the plurality of drones includes instructions that, when executed by the processor, cause the processor to distribute the plurality of drones within edges defining the surface.

In Example 41, the subject matter of any one or more of Examples 39-40 optionally include wherein distributing the plurality of drones includes instructions that, when executed by the processor, cause the processor to distribute the plurality of drones proximate edges defining the surface.

In Example 42, the subject matter of any one or more of Examples 36-41 optionally include wherein the aspects of the aerial image include a volume.

In Example 43, the subject matter of Example 42 optionally includes wherein distributing the plurality of drones includes instructions that, when executed by the processor, cause the processor to distribute a majority of the plurality of drones proximate corners or edges of the volume.

In Example 44, the subject matter of any one or more of Examples 36-43 optionally include wherein the aspects of the aerial image include shading.

In Example 45, the subject matter of any one or more of Examples 36-44 optionally include wherein distributing the plurality of drones includes instructions that, when executed by the processor, cause the processor to distribute a subset of the plurality of drones.

In Example 46, the subject matter of any one or more of Examples 36-45 optionally include wherein distributing the plurality of drones includes instructions that, when executed by the processor, cause the processor to: distribute a first subset of the plurality of drones, the first subset of the plurality of drones having a first color; and distribute a second subset of the plurality of drones, the second subset of drones having a second color.

Example 47 is at least one machine-readable medium including instructions that, when executed by processing circuitry, cause the processing circuitry to perform operations to implement of any of Examples 1-46.

Example 48 is an apparatus comprising means to implement of any of Examples 1-46.

Example 49 is a system to implement of any of Examples 1-46.

Example 50 is a method to implement of any of Examples 1-46.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A drone comprising:
   a processor; and
   a memory storing instructions that, when executed by the processor, cause the drone to perform actions comprising:
      receiving, from a remote computer, coordinates defining positions of the drone in an aerial image formed by a plurality of drones, wherein receiving the coordinates comprises receiving a combination of absolute and relative coordinates, and
      flying the drone to the coordinates.

2. The drone of claim 1, wherein receiving the coordinates comprises receiving a file that includes the coordinates.

3. The drone of claim 1, wherein receiving the coordinates comprises receiving the relative coordinates as a vector defining a distance and direction from a beacon.

4. The drone of claim 1, wherein the absolute coordinates define positions of the drone as latitudes, longitudes, and altitudes.

5. The drone of claim 1, wherein receiving the relative coordinates comprises receiving the relative coordinates define positions of the drone relative to a master drone.

6. The drone of claim 1,
   wherein receiving the coordinates comprises receiving vectors, and
   wherein the actions further comprise translating the absolute coordinates from the vectors into global positioning system (GPS) coordinates that define latitudes, longitudes, and altitudes for the drone.

7. The drone of claim 6, wherein the actions further comprise flying to the latitude, the longitude, and the altitude.

8. A drone comprising:
   a processor; and
   a memory storing instructions that, when executed by the processor, cause the drone to perform actions comprising:
      receiving, from a remote computer, coordinates defining a flightpath of the drone in an aerial image formed by a plurality of drones, wherein receiving the coordinates comprises receiving a combination of absolute and relative coordinates, and
      flying the flightpath.

9. The drone of claim 8, wherein receiving the coordinates comprises receiving a file that includes the coordinates.

10. The drone of claim 8, wherein receiving the coordinates comprises receiving the relative coordinates as vectors defining distances and direction from a beacon.

11. The drone of claim 8, wherein the absolute coordinates define positions of the drone as latitudes, longitudes, and altitudes.

12. The drone of claim 8, wherein receiving the relative coordinates comprises receiving the relative coordinates as vectors defining distances and direction from a master drone.

13. The drone of claim 8,
   wherein receiving the coordinates comprises receiving vectors, and
   wherein the actions further comprising translating the absolute coordinates from the vectors into global positioning system (GPS) coordinates that defines latitudes, longitudes, and altitudes for the drone.

14. A drone from a plurality of drones, the drone comprising:
   a processor; and
   a memory storing instructions that, when executed by the processor, cause the drone to perform actions comprising:
      authenticating communications between the drone and a remote computer,
      receiving, from the remote computer, coordinates defining positions of each of the plurality of drones in an aerial image formed by the plurality of drones, wherein receiving the coordinates comprises receiving the coordinates as vectors, and
      flying the drone to a subset of the coordinates, the subset of coordinates assigned to the drone.

15. The drone of claim 14, wherein the actions further comprise transmitting a location of the drone to the remote computer.

16. The drone of claim 14, wherein the actions further comprise translating the coordinates from the vectors into global positioning system (GPS) coordinates that defines latitudes, longitudes, and altitudes for the drone.

17. The drone of claim 14, wherein the vectors define positions of the drone relative to a beacon or a master drone.

18. A drone comprising:
   a processor; and
   a memory storing instructions that, when executed by the processor, cause the drone to perform actions comprising:
      receiving, from a remote computer, coordinates defining positions of the drone in an aerial image formed by a plurality of drones, and
      flying the drone to the coordinates,
   wherein receiving the coordinates comprises receiving vectors, and
   wherein the actions further comprise translating a first subset of the coordinates from a first subset of the vectors into global positioning system (GPS) coordinates that define latitudes, longitudes, and altitudes for the drone.

19. The drone of claim 18, wherein a second subset of the coordinates are relative coordinates defined by a second subset of the vectors defining a distance and direction from a beacon.

20. The drone of claim 18, wherein a second subset of the coordinates are relative coordinates defined by a second subset of the vectors defining positions of the drone relative to a master drone.